United States Patent [19]
Washizuka et al.

[11] 4,104,727
[45] Aug. 1, 1978

[54] LIQUID CRYSTAL DISPLAY CALCULATOR CONSTRUCTION

[75] Inventors: Isamu Washizuka, Kyoto; Shintaro Hashimoto, Nara; Masaru Kakumae, Yamatokoriyama; Yuuichi Sato, Nara; Isao Fujisawa, Yamatokoriyama; Yukihiro Inoue, Kashihara; Sadakatsu Hashimoto, Yamatokoriyama; Yoshio Takeda, Nara; Mitsuo Ishii, Yamatokoriyama; Yoshitomo Kitanishi, Kashihara, all of Japan

[73] Assignee: Sharp Kabushiki Kaisha, Osaka, Japan

[21] Appl. No.: 725,928

[22] Filed: Sep. 23, 1976

[30] Foreign Application Priority Data

Sep. 23, 1975 [JP] Japan .................... 50-115190
Sep. 23, 1975 [JP] Japan .................... 50-115191
Sep. 23, 1975 [JP] Japan .................... 50-115192
Sep. 23, 1975 [JP] Japan .................... 50-115193

[51] Int. Cl.² .................... G06F 15/02; G02F 1/13
[52] U.S. Cl. .................... 364/710; 29/529 R; 350/337; 364/712
[58] Field of Search .............. 235/152, 156; 29/569 L, 29/571, 577, 589, 592; 200/5 A; 350/160 LC

[56] References Cited

U.S. PATENT DOCUMENTS

| | | | |
|---|---|---|---|
| 3,911,234 | 10/1975 | Kotaka ................... | 200/5 A |
| 3,936,930 | 2/1976 | Stern ..................... | 29/592 |
| 3,964,158 | 6/1976 | Janning ................. | 29/592 |
| 3,967,882 | 7/1976 | Kubota et al. ......... | 350/160 LC |

*Primary Examiner*—Jerry Smith
*Attorney, Agent, or Firm*—Birch, Stewart, Kolasch & Birch

[57] ABSTRACT

In an electronic calculator essentially comprising a multidigit display, a keyboard and a data processor unit, a multidigit liquid crystal display is deposited together with integral key actuators of the keyboard on a flexible circuit film which carries electrical conductor leaves in a desired pattern. The conductor leaves to be in contact with terminals of the liquid crystal display are formed to extend in the direction of length of the liquid crystal display to thereby establish room for a battery compartment.

22 Claims, 47 Drawing Figures

FIG 8 (A)
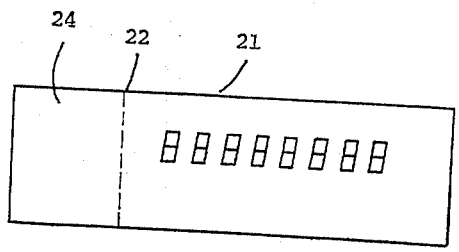
FIG 8 (B)
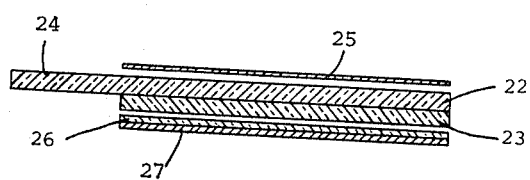
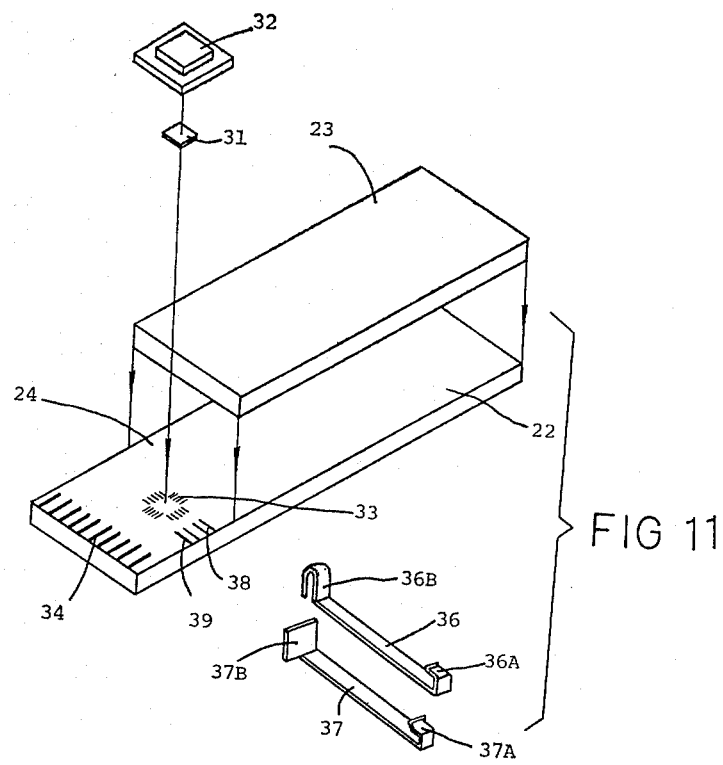
FIG 11

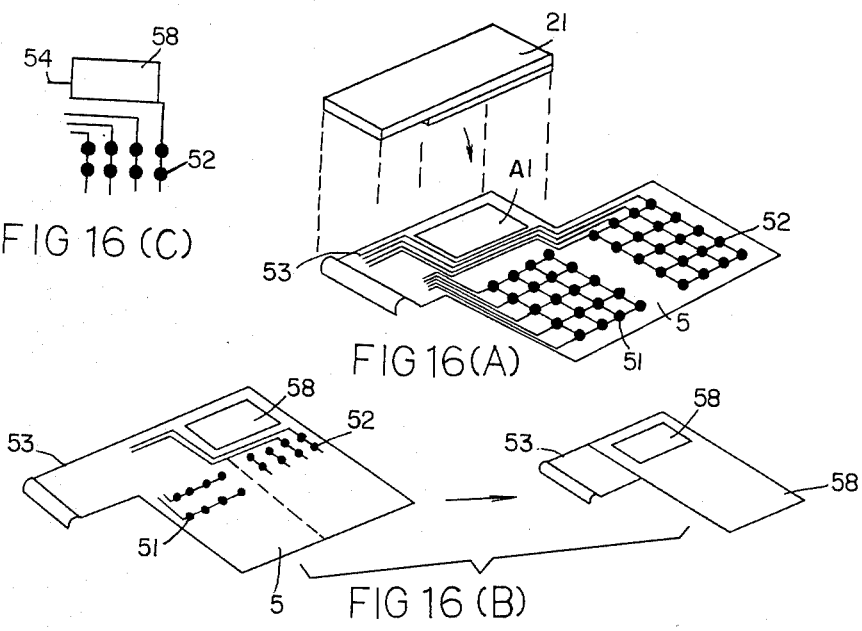
FIG 16 (C)
FIG 16 (A)
FIG 16 (B)
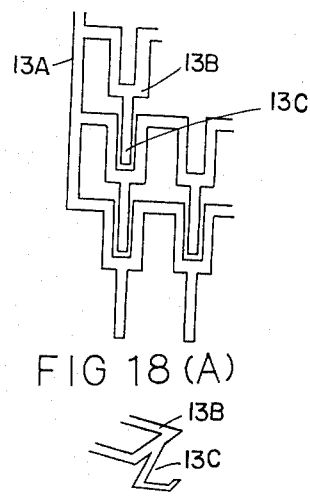
FIG 18 (A)
FIG 18 (B)
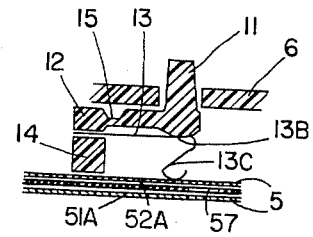
FIG 17

LIQUID CRYSTAL DISPLAY CALCULATOR CONSTRUCTION

BACKGROUND OF THE INVENTION

The present invention relates to a new schematic construction of electronic desk-top calculators essentially containing a display, a keyboard and a data processor unit, which has a combination of desirable features: compactness, light weight, productivity, economy and reliability.

Accordingly, it is an object of the present invention to provide electronic calculators which enable not only simplified construction of its individual components such as a display, a printed circuit board, a keyboard and a data processor unit, but also streamlined correlative arrangement of these components in order to attain compact and light weight construction and more particularly a low profile scheme.

It is another object of the present invention to provide improved calculators which carry electrical connections communicating between its individual components such as a display, a printed circuit board, a data processor unit, a battery, etc. and focused on a single point to thereby attain high degree of productivity.

It is still another object of the present invention to provide improved calculators wherein a cell or cells of liquid crystal are employed as a display and implementations of these liquid crystal cells are effectively combined with other components such as a circuit board, a keyboard, a data processor unit, a battery, etc.

With the aid of recent developments in the art of calculators, the individual components for example displays, data processor units, keyboards and power supplies are smaller and more closely and firmly united. For the displays, conventional NIXIE tubes and electroluminescent tubes of relatively large size have been replaced by miniature liquid crystal display cells. In addition, keyboards consisting of printed circuit boards and key actuators have been replaced by those employing folded flexible circuit films. See, for example, U.S. Pat. No. 3,911,234 issued on Oct. 7, 1975 and entitled KEYBOARD TYPE SWITCH ASSEMBLY HAVING FIXED AND MOVABLE CONTACTS DISPOSED ON FOLDABLE FLEXIBLE PRINTED CIRCUIT BOARD.

To meet the requirements that calculators be more compact and economical as stated above, the concept of the present invention is characterized by simplified constructions and effective organic arrangements of the individual components of electronic calculators, that is, the display, the printed circuit board, the keyboard, the data processor unit and the power supply.

BRIEF DESCRIPTION OF THE DRAWINGS

A better understanding of the present invention may be had from a consideration of the following detailed description taken in conjunction with the accompanying drawing in which:

FIGS. 8(A) and 8(B) are top plan and cross sectional side views respectively, of the liquid crystal display after being fabricated;

FIGS. 9(A) and (B) are explanatory diagrams showing the relative position of polarizing filters employed with the liquid crystal display, wherein FIG. 9(A) shows the prior art arrangement and FIG. 9(B) shows the arrangement of filters in the present invention;

FIG. 11 is an exploded perspective view of the liquid crystal display cell employed with the present invention;

FIGS. 16(A), 16(B) and 16(C) are schematic diagrams showing some of the implementations of reflectors on the printed circuit flexible film;

FIG. 17 is a partially enlarged cross sectional view of the keyboard employed with the present invention;

FIGS. 18(A) and 18(B) are explanatory diagrams of the spring plate provided with the keyboard of the present invention;

FIGS. 20(A), 20(B) and 20(C) are examples of sealing means for the keyboard portion wherein FIGS. 20(A) and 20(B) are plane views of the flexible film and FIG. 20(C) is a cross sectional view of the sealed type keyboard portion of the present invention;

DETAILED DESCRIPTION OF THE INVENTION

Figure 1:
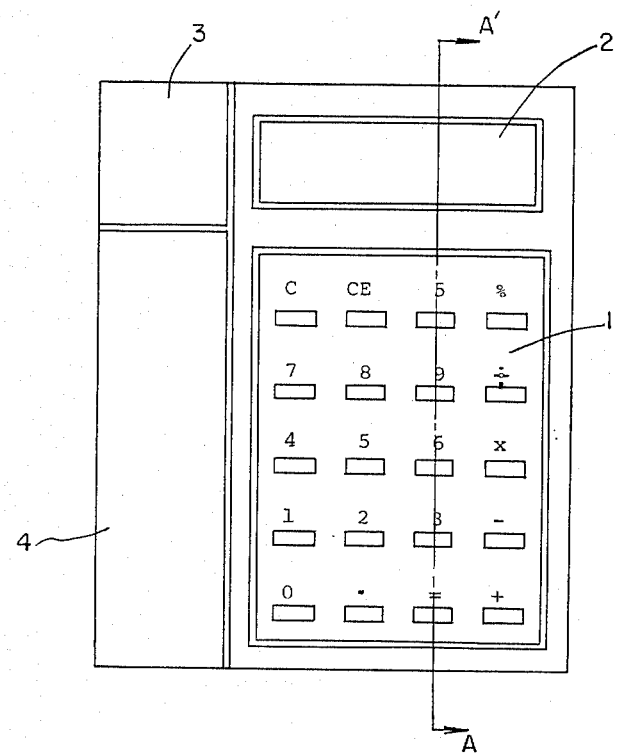
FIG. 1 is a plan view of an electronic calculator embodying the present invention.

Referring now to FIG. 1, there is illustrated a plan view of an electronic hand held calculator constructed in accordance with the present invention, which essentially comprises integral key actuators 1 of a keyboard unit, a display 2 having its longitudinal dimension orthogonal to the longitudinal direction of the keyboard unit containing the key actuators 1, a data processor circuit unit 3 provided adjacent one end of the longitudinal dimension of display 2 and a power supply battery 4 provided adjacent to both the key actuators 1 and the data processor unit 3.

Figure 2:
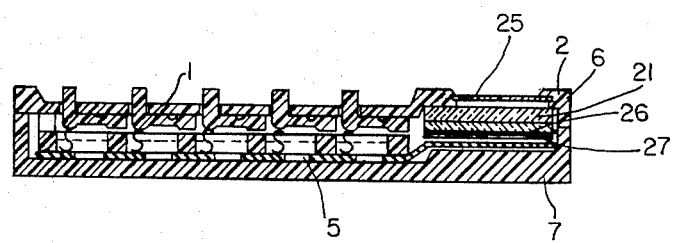
FIG. 2 is a cross sectional view taken along the line A—A' of FIG. 1.
Figure 3:
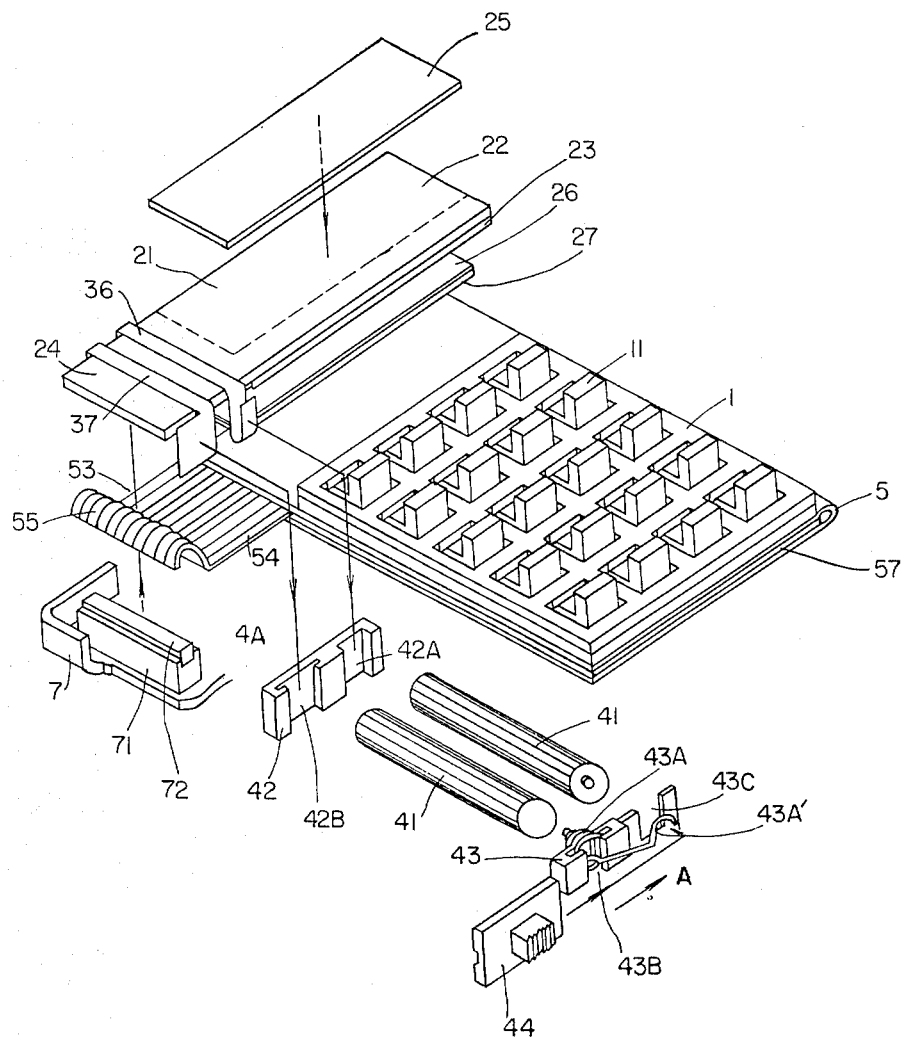
FIG. 3 is an exploded perspective view showing the internal construction of the calculator of FIG. 1.

FIG. 2 illustrates a cross sectional view taken along the line A—A' of FIG. 1 wherein the key actuators 1 and the display 2 are deposited on a printed circuit flexible film 5 carrying electrical connector leaves and then housed within an upper casing 6 and a lower casing 7. FIG. 3 illustrates an exploded perspective view of the internal arrangement of these constitutional components which will be respectively discussed in the following detailed description.

[DISPLAY]

The display is implemented with a liquid crystal cell and more particularly a field effect mode liquid crystal cell. This liquid crystal cell 21 comprises a pair of glass sheets 22, 23 holding the field effect mode liquid crystal, one of which (22, for example) is provided with an extension in the longitudinal dimension of the liquid crystal display, that is, a direction orthogonal to the longitudinal dimension of the keyboard unit including the key actuators 1, as viewed from FIG. 3. The liquid crystal cell 21 of the type stated above is preferably from the viewpoint of simplified construction. In other words, the liquid crystal cell 21 with such an arrangement is suitable for automated manufacture for mass-production purposes and multiple processing even if made by hand.

Figure 4:
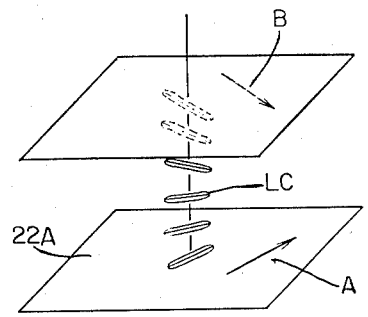
FIG. 4 is an explanatory diagram showing the twisted nematic phase of the liquid crystal display employed in the calculator of FIG. 1.
Figure 5A:
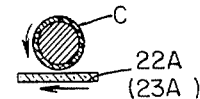
FIGS. 5(A), 5(B), 5(C) and 5(D) are flow diagrams showing steps during the crystal rubbing procedure.
Figure 5B:
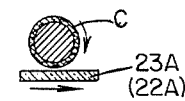
Figure 5C:
Figure 5D:
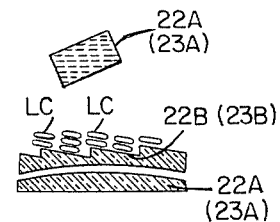

The liquid crystal cell 21 illustrated in FIG. 4 is a twisted nematic phase cell which has undergone horizontal orientation processing (rubbing) which is carried out on the opposed surfaces of the glass sheets 22A, 23A for the purposes of twisting alignment of the liquid crystal molecules. This is a procedure for providing the liquid crystal molecules LC with preferred orientation, therefore, improving the viewing angle characteristics of the liquid crystal cell 21. The rubbing directions for the respective glass sheets 22A, 22B are at right angles with respect to each other as denoted by the arrows A, B, and as a consequence, the liquid crystal molecules LC are aligned along the rubbed glass sheets 22A, 23A with accompanying the step-by-step twisted relationship therebetween. As suggested in FIGS. 5 (A) and 5 (B), the horizontal orientation processing (rubbing) can be accomplished by sliding a cloth C on the opposed surfaces 22A, 23A of the glass sheets with rotation of the cloth C. Alternatively, a film of $SiO_2$ and the like with oriented fine grooves can be formed on the surfaces 22A, 23A of the glass sheets by oblique vacuum deposition technique to thereby assure the desired molecular alignment. FIG. 5 (C) and FIG. 5 (D) depict the aspects of the thus rubbed glass surfaces 22A, 23B in a top plan view and a side cross-sectional view, respectively. More particularly, the grooves 22B (23B) are provided with the desired orientation and a saw-tooth shape in the rubbing direction. Thus, the liquid molelcules LC are aligned with the saw-tooth surface of the grooves.

To this end, since the liquid crystal molecules will be oriented along the saw-tooth surfaces of the opposed glass sheets when applying an electric field, the orientation behavior becomes stable to thereby assure improved viewing angle characteristics.

Figure 6A:
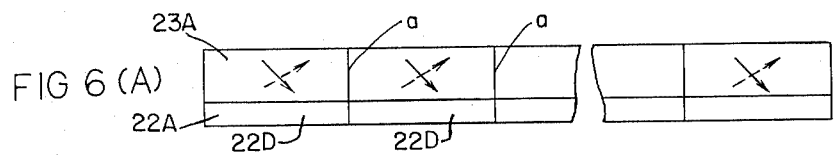
FIGS. 6(A), 6(B) and 6(C) are explanatory diagrams showing respective rubbing directions during the rubbing procedure.
Figure 6B:
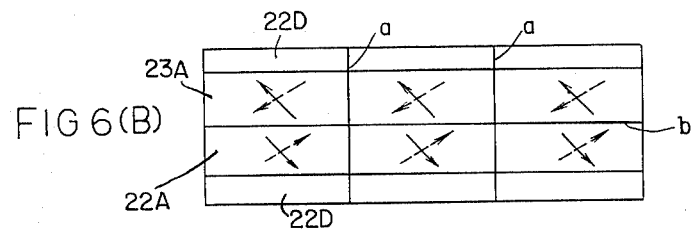
Figure 6C:
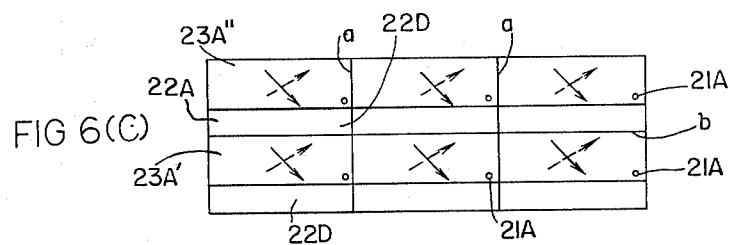
Figure 6:
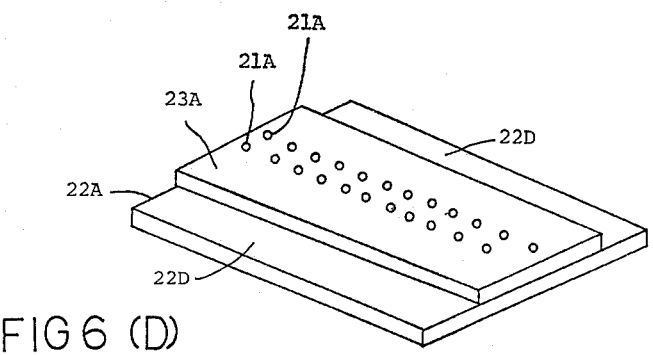
FIGS. 6(D) and 6(E) are detailed explanatory diagrams of FIG. 6(B)
Figure 6:
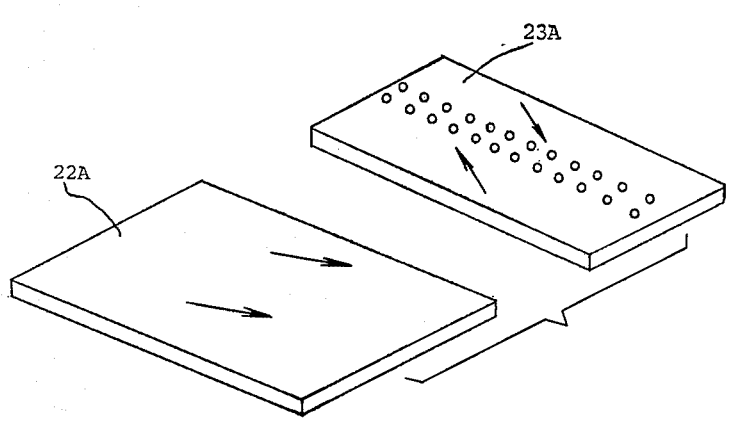

FIGS. 6 (A), 6 (B) and 6 (C) are plan views showing a variety of combinations of the glass sheets 22A, 23A and rubbing directions in fabrication of the liquid crystal cell. In the FIG. 6 (A), longitudinal dimension of the glass sheets 22A, 23A are aligned in the same direction as that of the liquid crystal cells 21. One of the glass sheets 22A is provided with an extension 22D for display connections in a direction transverse to the longitudinal direction of the glass sheets. The respective extensions 22D are separated by the line a.

FIG. 6 (B) depicts another example wherein respective liquid crystal cells 21 are disposed in parallel relationship on the glass sheets 22A, 23A of relatively broader width in such a way that the longitudinal direction of the liquid crystal cells are in agreement with that of the glass sheets 22A, 23A as in the above example. Similarly, the regions 22D for display connections are provided in an orthogonal fashion. The liquid crystal cells are separated by the lines a and b.

The third and last example of FIG. 6(C) resembles the second example of FIG. 6(B) except that at least one of the glass sheets 23A is partitioned into two segments 23A' and 23A". The reference 21A represents a liquid crystal insertion aperture.

In these drawings, the arrow defined by the solid line shows the rubbing direction of the one glass sheet 22A whereas the arrow defined by the broken line shows the rubbing direction of the other glass sheet 23A. As noted earlier, the rubbing directions are right-angled to each other.

Nevertheless, there are still various problems in the above discussed examples of FIGS. 6(A), 6(B) and 6(C). When manufacturing the liquid crystal cells 21 of FIG. 6(A), substantially long lengths are required for the glass sheets 22A, 23A. This creates difficulties in manufacturing the liquid crystal cells in view of limitations on size of production facilities, for example, printers and also provide distortion problems due to "arched" glass sheets.

In case of the liquid crystal cell 21 illustrated in FIG. 6(B) there is a requirement that the rubbing directions of the glass sheets 22A, 23A be different from each other. That is to say, FIG. 6(D) illustrates a perspective view of FIG. 6(B) and FIG. 6(E) illustrates the rubbing directions of the glass sheets 22A, 23A. To this end, while one of the glass sheet, for example, 22A is being rubbed in a specific direction, a protecting mask should be positioned against the adjacent surface to be rubbed in the opposite direction. Failure to do so will result in that the rubbing is effected in the opposed directions on the same glass surface.

In the case of FIG. 6(B), the rubbing procedure will be troublesome and cutting of the glass sheets should be effected in the opposed or different directions.

In case of FIG. 6(C) of FIG. 6(C), while the rubbing directions of the glass sheets 22A, 23A are in agreement with each other to thereby overcome difficulties in the rubbing procedure to a certain extent, the liquid crystal composition filling procedure will be troublesome because of interspersion of the liquid crystal filling apertures. That is, when the liquid crystal composition is to be inserted into the respective liquid crystal cells, the composition should be injected by means of an injector or the whole of the glass sheets 22A, 23A', 23A" should be dipped in a liquid crystal reservoir such that the respective cells would be filled with the liquid crystal composition via the apertures 21A through the utilization of capillary tube effects. In the former method injection of the liquid crystal composition is repeatedly required. In the latter method unwanted liquid crystal composition on the entire surfaces of the glass sheets should be cleaned away after filling up of the liquid crystal composition. These methods, therefore, are not deemed favorable in view of the foregoing.

One approach shown in FIGS. 7(A) through 7(D) is suggested to avoid the above discussed disadvantages. The longitudinal directions of the respective liquid crystal cells 21 are positioned at right angles to the direction of the length of the glass sheets 22A, 23A. See FIGS. 7(A) and 7(B). A plurality of the liquid crystal cells 21 of the lateral type in the direction of length of the glass sheets 22A, 23A are furnished by division along the line a. One of the glass sheet pair 22A is provided with the extension 22D for display connection. See FIG. 7(C). The insertion apertures 21A are formed at the positioned opposed to the display connection regions 22D.

The liquid crystal cell fabrication method suggested with respect to FIGS. 7(A) through 7(D) has a combination of advantageous features as set forth below.

(1) Since the direction of width of the respective liquid crystal cells is positioned in the longitudinal direction of the glass sheets, a multiplicity of the liquid crystal cells can be furnished along the longitudinal direction of the glass sheets and the "arched" glass problem can be solved.

(2) As illustrated in FIG. 7(D), the rubbing procedure for the two glass sheets 22A, 23A is effected in the same direction to thereby overcome the difficulties encountered with respect to FIG. 6(B).

(3) Only the two glass sheets 22A, 23A are employed such that a glass laminating procedure is facilitated and also the glass cutting procedure is simplified for only one line a and in one direction.

(4) Since the liquid crystal composition insertion apertures 21A are concentrated at only one end of the respective glass sheets 22A, 23A, all that is necessary to complete the filling up of the liquid crystal composition is to dip that end of the glass sheets into the liquid crystal reservoir. This overcomes the problem experienced in case of FIG. 6(C).

(5) The advantages set forth in the above paragraphs (1) through (4) make the liquid crystal cells suitable for mass-production purposes. In addition, it permits a multiplicity of the liquid crystal cells to be furnished at the same time.

Figure 7:
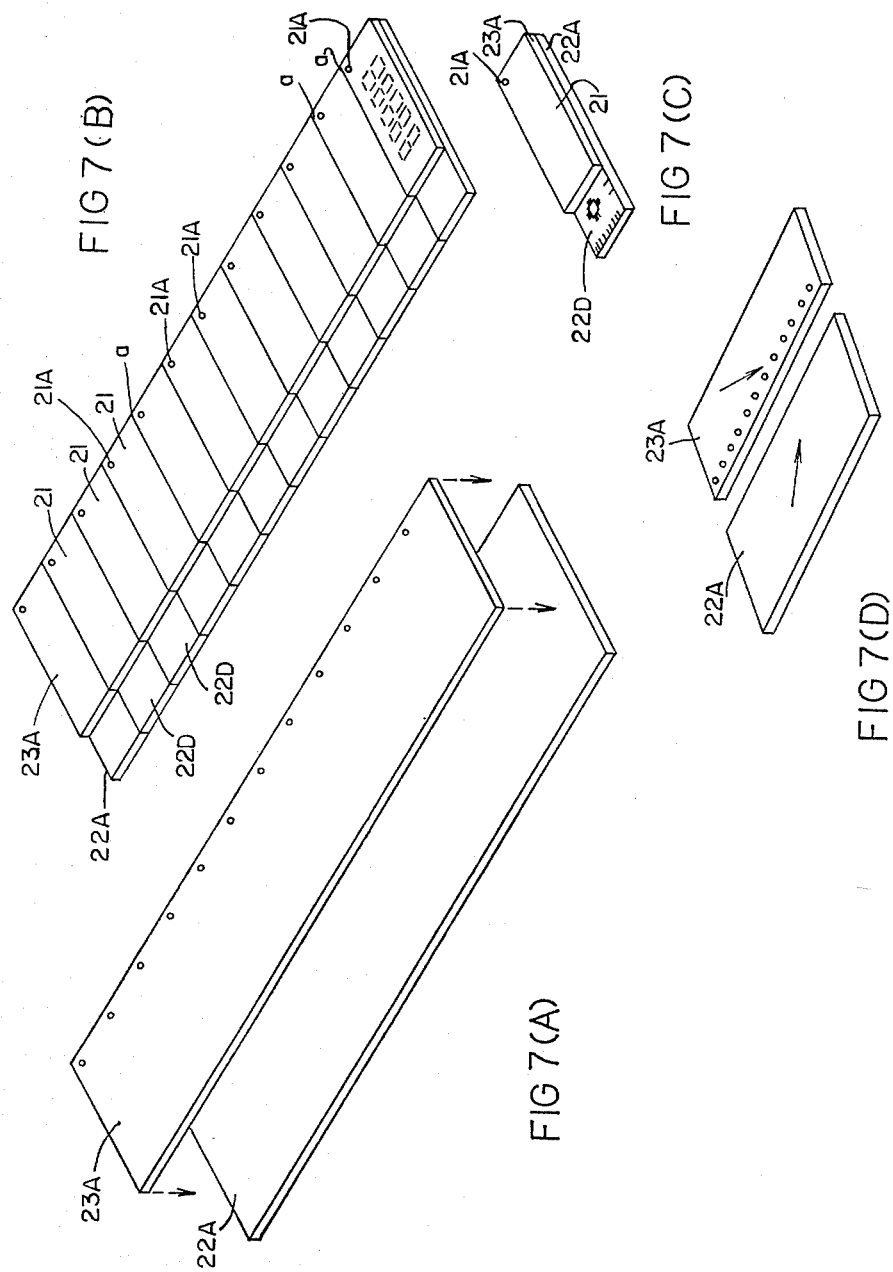
FIGS. 7(A), 7(B), 7(C) and 7(D) are perspective views of the liquid crystal display during the fabrication steps.

As will be obvious from a plan view of FIG. 8(A), the liquid crystal cell 21 as set forth above has eight digit display positions in its longitudinal direction and an extension 24 for a display connection (corresponds to 22D in FIG. 7). Electrical connections for the liquid crystal cell 21 are therefore provided via the extension 24. FIG. 8(B) illustrates a cross sectional side view therein a pair of polarizing filters 25, 26 are provided above and below the liquid crystal cell 21 and a reflector plate 27 is deposited below the lower polarizing filter 26.

The polarizing filters 25, 26 are essential to the field effect mode of the liquid crystal and are deposited in intimate contact with the surfaces of the liquid crystal cell 21 in accordance with known manners such as sticking, adhering and pressure adhering.

However, in the event that the contact status between the polarizing filters 25, 26 and the liquid crystal cell 21 is partially different and either of the filters 25, 26 is curved, that curved portion will come into contact with the plane surfaces of the liquid crystal cell 21 to thereby develop a homocentric circle and thus Newton rings by means of interference of light.

FIG. 9(A) shows an example which will create the possibility of occurence of the Newton rings, when the polarizing filters 25, 26 are both curved relative to the plane surface of the glass sheets 22, 23 of the liquid crystal cell 21, and filters both contact sheets 22, 23. To this end, there is a difference in light path length between light $L_1$ reflected from the lower surface of the polarizing filter 25 and light $L_2$ reflected from the upper surface of the glass sheet 22. If such difference in light path length closely approximates the wavelength of light, then the Newton rings will appear. The same is applicable to the relationship between reflected light $L_3$ and reflected light $L_4$.

Implementations shown in FIG. 9(B) are to prevent the above stated phenomenon from developing. The pair of polarizing filters 25, 26 are spaced from the glass sheets 22, 23 a distance considerably great with respect to the wavelength of light. With such an arrangement, the difference in light path length between the reflected light $L_1$ around the polarizing filter 25 and the reflected light $L_2$ around the glass sheet 22 becomes greater than the wavelength of light to thereby preclude the formation of the Newton rings. Likewise, the Newton rings will not appear between the reflected light $L_3$ and $L_4$.

Figure 9:
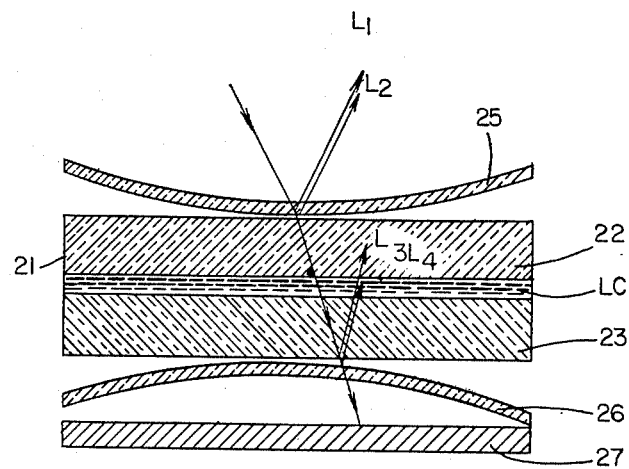
Figure 9:
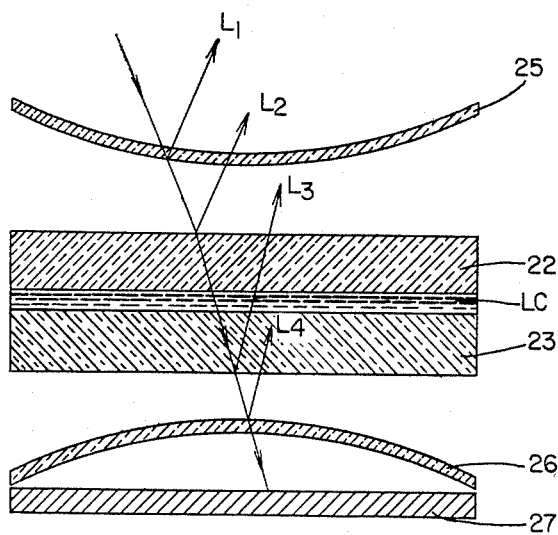
Figure 10A:
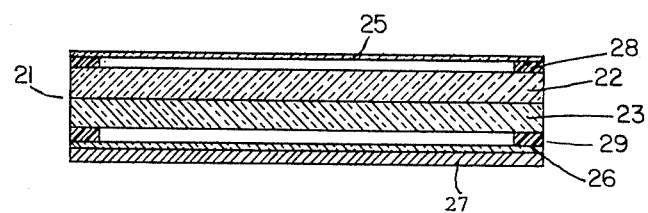
FIGS. 10(A) and 10(B) are cross sectional views showing examples of installation of the polarizing filters.
Figure 10B:
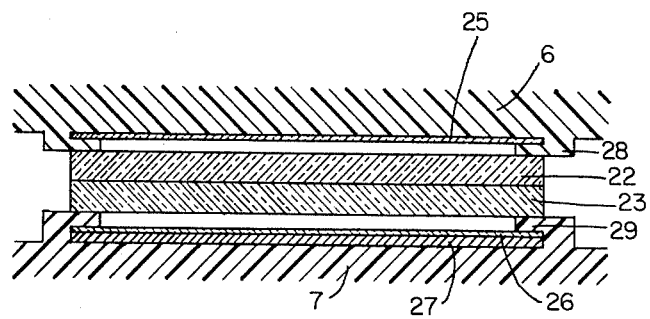

FIG. 10 suggests some installation assemblies for the polarizing filters 25, 26. In FIG. 10(A), the polarizing filters 25, 26 are respectively installed by sticking, adhering or the like with intervention of spacers 28, 29 between the glass sheets 22, 23 of the liquid crystal cell 21 and the polarizing filters 25, 26. FIG. 10(B) shows another example wherein the spacers 28, 29 are integrally united with the upper and the lower casings 6, 7. The spacers 28, 29 function to keep the distance between the glass sheets 22, 23 and the polarizing filter 25, 26 sufficiently greater than the wavelength of light. In FIGS. 9 and 10, 27 designates the reflector plate and LC designates the liquid crystal.

[Data processing unit]

The data processing unit is implemented with an MOS/LSI semiconductor chip, as well known in the art of calculators. By effective utilization of the extension 24 of the liquid crystal cell 21, the data processing unit chip may be installed.

FIG. 11 is an exploded perspective view illustrating the liquid crystal cell 21 and an installation assembly for the LSI chip 31. The extension 24 of the one glass sheet 22 in the liquid crystal cell 21 is previously provided at its rear surface with a desired printed circuit array to establish terminals 33 available for the installation of the LSI chip. Solder welding is effected on these terminals 33. The LSI chip 31 is mounted in such a way that its terminals confront the corresponding terminals 33. The terminals of the LSI chip 31 are tightly connected with the counterparts 33 of the glass sheet 22 in accordance with a solder welding technique. Accordingly, the LSI chip 31 is mounted on the glass sheet 22 as the extension 24 of the glass sheet 22 serves as a physical support and simultaneously electrical connections are provided between the LSI chip 31 and the liquid crystal display cell 21. It will be noted that the connection terminals 34 are formed at the end portion of the extension 24. The LSI chip 31 is covered with a cap 32 for protection purposes. The protecting cap 32 is preferably made of glass. The employment of the glass cap 32 is to simplify the attaching procedure and ensure tight attachment. In other words, distortions and hence cracks of the glass sheets will not be caused during the adhering procedure because the cap 32 (glass) has the substantially same coefficient of expansion as the extension 24 of glass material. Moreover, since the glass cap 32 is transparent, photobonding methods may be used wherein photosetting adhesive is employed and light exposure is applied thereto. Especially, attachment of the glass cap 32 through the photobonding methods needs no step of installing the glass cap 32 immediately after coating of the adhesive since the progress of vulcanization of the adhesive is controllable under light exposure. This implies that the adhesive coating step should not follow the cap attaching step with the results in simplification in the LSI chip installation procedure.

Figure 12:
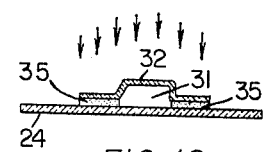
FIG. 12 is an explanatory diagram of an example of the installation of the data processor LSI chip employed with the present invention.

FIG. 12 illustrates an example of installation of the glass cap 32 which substantiates the photobonding technique. The periphery of the LSI chip 31 on the glass sheet 24 (extension) is coated with the photosetting adhesive 35 and then the LSI chip 31 is covered with the dish-like glass cap 32 in such a way that the periphery of the cap 32 corresponds to the adhesive 35. Subsequent to this, light (or ultraviolet rays) is applied to vulcanize the adhesive 35. In FIG. 11, 36, 37 are leaf spring contact members secured on the extension 24 which will be discussed in detail below.

[Printed circuit flexible film]

The board 5 is a printed circuit flexible film which carries electrical leaf conductors on a flexible film such as a polyester, some serving as key contacts in the keyboard unit and the remainder serving as interconnections between the respective constitutional components.

Figure 13:
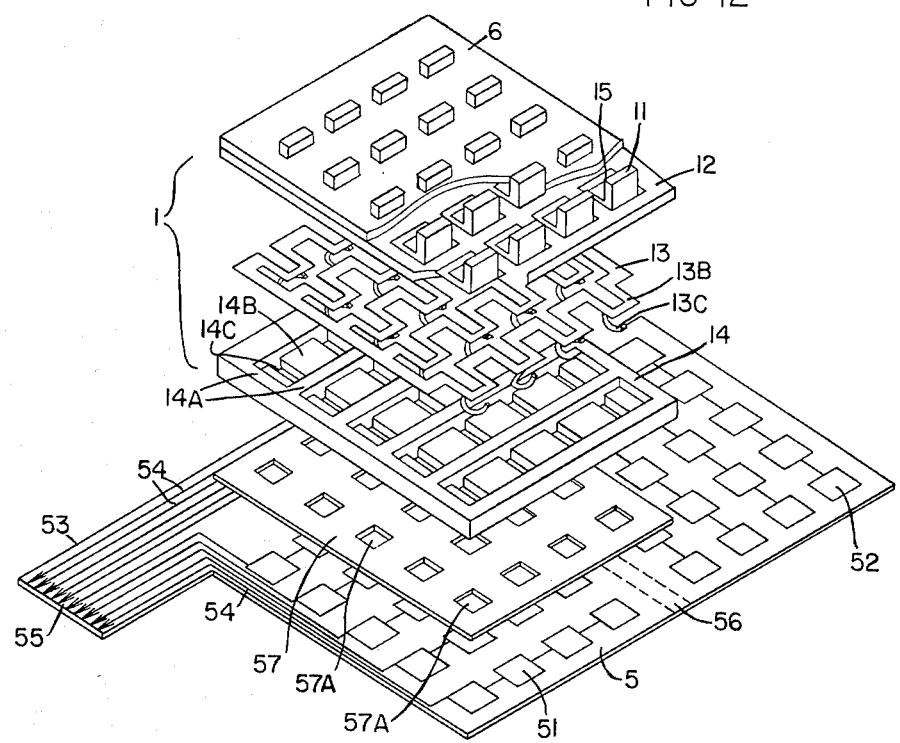
FIG. 13 is an exploded perspective view of integral key actuators and a flexible printed circuit film.

FIG. 13 is a perspective view wherein the key actuators and the board 5 shown in FIGS. 2 and 3 are exploded. The flexible film 5 has on its one major surface a first set of key contacts 51 and a second set of key contacts 52 together with conductors 54 leading to the key contacts 51, 52 and a terminal region 55 where the leaf conductors 54 are concentrated. The first and second sets of the key contacts are held in the opposed relationship. That is to say, the flexible film 5 is folded about a region 56 such that the first set of the key contacts 51 confronts against the second set 52. When the flexible film 5 is folded, a spacer 57 made of elastic insulator material is intervened therebetween. Throughholes 57A formed in the spacer 57 are between the key contacts 51, 52. Therefore, when a specific contact area of the flexible film 5 is manually depressed, that corresponding contact is closed. If the depression is released, that contact is open.

More particularly, when a specific key contact is depressed, the upper contact will come into contact with the lower contact after passing through the through-hole 57A to establish a closed circuit due to the flexibility of the film 5. If the depression is released, the upper contact will be separated from the lower contact by virtue of stability of the flexible film 5 and intervention of the spacer 57.

Meantime, the terminal regions 55 where the leaf connectors 54 are gathered together, are provided on an extension of the flexible film 5. This extension of the flexible film 5 corresponds to the extension 24 of the liquid crystal cell 21. Accordingly, electrical connections between the printed circuit flexible film 5 and the liquid crystal cell 21 are provided via these extensions 53, 24.

As viewed from FIG. 3, to achieve electrical connections between the printed circuit flexible film 5 and the liquid crystal cell 21, the tip portion of the extension 53 of the flexible film 5, that is, the terminal region 55 is curved to come into contact with the terminals 34 formed at the extension 24 of the liquid crystal cell 21 through the utilization of the flexibility of the printed circuit film 5.

The electrical connections between the terminals 55, 34 of the extensions 53, 24 are maintained in the following manner. A pressure member 71 is provided which is integrally united with the lower casing 7 and received below the curved terminal region 55 when the upper casing 6 is fitted into the lower casing 7. An elastic member 72 such as rubber also is provided above the pressure member 71. Both the terminals 55, 34 are held in intimate contact with each other under pressure upon upward depression of the member 71. In this way, the terminals 55, 34 are sandwiched in electrically connected relationship between the upper casing 6 and the pressure member 71. The details of the integral key actuators will be discussed in detail later.

Figure 14:
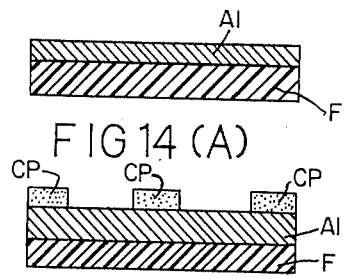
FIGS. 14(A), 14(B) and 14(C) are cross sectional views showing fabrication steps for the flexible printed circuit film.
Figure 14:
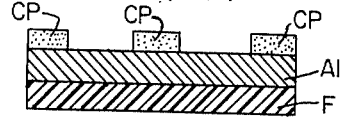
Figure 14:
Figure 15:
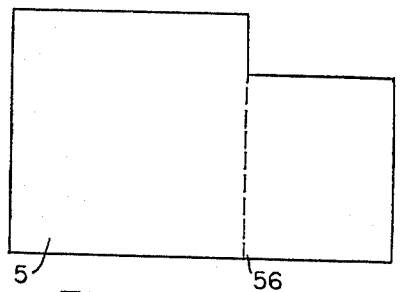
Figure 15:
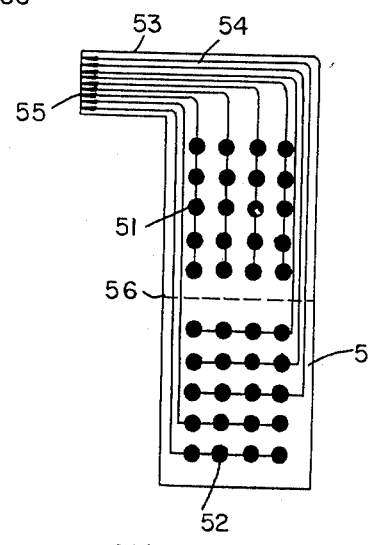

The following sets forth the fabrication of the printed circuit flexible film 5 as stated above. FIG. 14 shows a sequence of the fabrication steps.

(1) A leaf of aluminum Al is disposed on the entire area of an electrical insulator film F such as polyester by well known methods for example adhering and evaporation. see FIG. 14(A).

(2) For the key contacts 51, 52, the connectors 54 and the terminals 55 leaf conductors are formed in a desired pattern by printing of carbon paste CP. See FIG. 14(B).

(3) The insulator film F is dipped into etching liquid such as sodium hydroxide for etching purposes. See FIG. 14(C).

During the etching step the aluminum leaf Al is etched while remaining are the portions printed or coated with the carbon paste CP. Therefore, the resulting flexible film 5 contains three layers of the insulator film F, the aluminum leaf Al and the carbon paste CP.

The aluminum leaf conductors are advantageous, being stronger and more inexpensive than other metal materials such as copper, taking account into the facts that the flexible film 5 is folded and the fine conductors 54 also are folded.

Besides, the coating of the carbon paste CP consists of a mixture of carbon and resin such as epoxy resin to thereby exhibit strong adhesion. For this reason, when the film 5 is folded, the aluminium leaf conductors Al are reinforced with the carbon paste coating CP to prohibit breaking of the leaf conductors. The carbon paste CP prevents oxidation of aluminum and permits cost reduction as compared with gold plating or silver plating. Although the conductivity of the carbon paste is poor as compared with gold or silver, this never provides an obstacle to operation because the ground of aluminum is employed. When using a MOS-FET circuit, voltage drop can be ignored to a certain extent. The flexible film furnished as described above is most suitable even when it is folded in two as viewed from FIG. 13.

Figure 15:
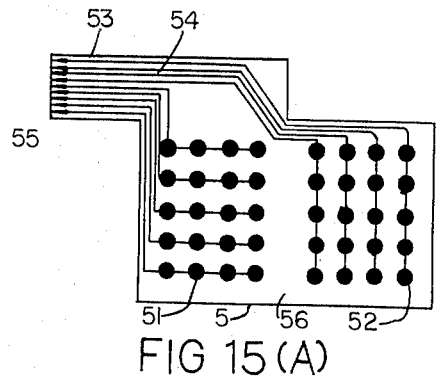
FIGS. 15(A), 15(B) and 15(C) are expanded views showing various shapes of the flexible printed circuit film.

FIGS. 15(A), 15(b) and 15(C) show a variety of shapes of the flexible film 5. FIG. 15(A) is a plan view of the flexible film as shown in FIG. 13. FIG. 15(B) is a plan view of the flexible film wherein the key contacts 51, 52 are formed in the direction of length of the film with intervention of the folding region 56. FIG. 15(C) is a plan view of the flexible film of which the construction resembles that of FIG. 15(A) except a cutout is not provided adjacent the extension 53 and the key contacts 51. FIG. 16 shows modified examples of the flexible film 5 illustrated in FIG. 13. In FIG. 16(A), the aluminum leaf conductor Al remains at the portion of the flexible film 5 where the liquid crystal cell 21 is received, during the fabrication steps shown in FIG. 14. That portion Al can be employed as the reflector for the liquid crystal cell 21 due to the light reflecting effects thereof. This avoids the necessity for the provision of the reflector 27 as shown in FIGS. 2, 3 or FIG. 10. As an alternative, as shown in FIG. 16(B), the flexible film 5 may be made of insulator materials of high transmission and provided with an extension above the second key contact region 52. The aluminum leaf Al and the carbon paste CP on the extension remain in the same manner as the contact regions 51, 52, the connectors 54, etc. to form the reflecting surface 58. When the flexible film 5 is folded about the portion 56, the aluminum leaf region Al will be exposed to the outside via the transparent insulator film. Therefore, this serves as the reflector plate for the liquid crystal cell 21.

The modified example shown in FIG. 16(B) can be completed by the same fabrication steps as discussed with respect to FIG. 14 and accordingly the reflecting surface of the aluminum leaf Al can be coated with the carbon paste CP. The reflecting surface 58 shown in FIG. 16(C) constitutes the portion of the connector 54.

[Integral key actuators]

As shown in FIGS. 2 and 3, the key actuators 1 are mounted on the board 5, of which the implementations are disclosed and illustrated in FIG. 13. In FIG. 13, the key actuators 1 comprise: a key actuator frame 12 carrying a plurality of movable key actuators 11 each of which corresponds to the key contacts 51, 52 formed in the folded flexible film 5; a leaf spring 13 provided below the key actuator frame 12 for depressing the flexible film 5 in union with depression of a specific key actuator 11; and a holding frame 14 which holds the leaf spring 13.

As obvious from a cross sectional view of a one key switch assembly shown in FIG. 17, all the respective key actuators 11 are communicated with the key actuator frame 12 via hinges 15. The key actuators 11, the hinges 15 and the key actuator frame 12 are combined into a unit component. Each of the key actuators 11 is protruded in the upward direction through the corresponding through-hole formed in the upper casing 6. When the thus protruded key actuators are depressed, they will be movable about the hinge regions 15.

As viewed from an enlarged view of FIG. 18(A), the leaf spring 13 includes side wall regions 13A, rectangular regions 13B communicating with the side wall regions and protrusion regions 13C which extend from the rectangular regions 13B in the same direction as the side wall regions 13A. These regions 13A, 13B, are integrally formed by well knwon techniques such as press working and etching.

The respective rectangular regions 13B correspond to their associated key actuators 11 such that the tip portions of the rectangular regions 13B are movable in the downward direction when their associated key actuators 11 are depressed. As shown in FIG. 18(B), the protrusion regions 13C are turned downwardly at the junctions with the rectangular regions 13B and further provided with "U" shaped tip portions. In this instance, the "U" shaped tip portions of the protrusion regions 13C are oriented inwardly toward the rectangular regions 13B.

Reverting to FIG. 13, the holding frame 14 has longitudinal and lateral beams 14A on which the junctions of the side wall regions 13A and the rectangular regions 13B in the leaf spring 13 are mounted. Within partitions defined by the longitudinal and lateral beams 14A there are provided hollow regions 14B. In addition, through-holes 14C are formed in positions to correspond to the respective protrusion regions 13C to thereby allow passage of only the corresponding protrusion regions.

Accordingly, in FIG. 13, when the crossed points of the side regions 13A and the rectangular regions 13B of the leaf spring 13 is mounted on the holding frame 14, the respective rectangular regions 13B of the leaf spring 13 are received within the hollow regions 14B of the holding frame 14 and the protrusion regions 13C are passed through the holes 14C at this time. The result is illustrated in FIG. 17.

In FIG. 17, the integrated key actuator 1 is deposited on the printed circuit flexible film 5 to position behind the opposed key contacts 51A, 52A. When the key actuator 11 is under the normal state, the protrusion region 13C of the leaf spring 13 is somewhat shifted from the position of the opposed key contacts 51A, 52A. Under these circumstances, the leaf spring 13 forces the key actuators in the upward direction.

When the key actuator 11 is manually depressed, the key actuator 11 turns downward about the hinge 15 with downward rotation of the protrusion region 13B. At the moment the protrusion region 13C forces the flexible film 5 toward the opposed contacts 51A, 52A since the "U" shaped tip portion of the protrusion region 13C of the leaf spring 13 is positioned inwardly with respect to the junction with the rectangular region 13B.

The key actuator 11 is depressed downward until the rectangular region 13B of the leaf spring 13 is positioned above the hollow region 14B of the holding frame 14. As a result, the protrusion region 13C of the leaf spring 13 is positioned above the opposed key contacts 51A, 52A to thereby place the latter into the closed state and in other words the ON state. If the depression of the key actuator 11 is released, then the key actuator 11 will be restored its original position shown in FIG. 17 by means of the spring force of the leaf spring 13.

The assemblying procedure for the key actuator unit 1 is facilitated and simplified due to a combination of the key actuator frame 12, the leaf spring 13 and the holding frame 14, thereby accomplishing the fabrication of low profile keyboard units. As well, since the key actuators 11, the hinges 15 and the key actuator frame 12 are integrally formed, spacing within the key actuator unit 1 will be minimized.

The holding frame 14 serves as a stop for preventing excessive depression of the key actuators 11 and, also functions for preventing the folded flexible film 5 from expanding outwardly due to its stability. Although within the construction of the key actuator unit 1 the key actuator frame 12 is separated from the upper casing 6, the casing 6 may be adapted to serve also as the key actuator frame 12.

[SEALED KEY SWITCH]

The opposed key contacts 51, 52 of the flexible film 5 shown with respect to FIGS. 13 and 17 may be of the sealed type as another modified example.

Figure 19A:
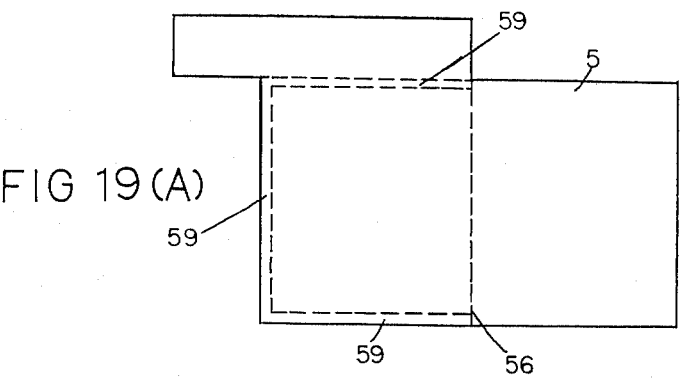
FIGS. 19(A) and 19(B) are explanatory diagrams showing the fabrication steps for sealing the keyboard portion of the present invention.
Figure 19B:
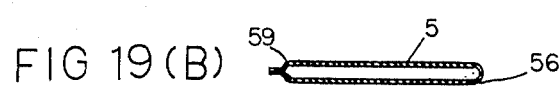

That is, while the flexible film 5 of FIG. 13 is folded in two such that the key contacts 51, 52 are positioned in the opposed relationship with intervention of the spacer 57, dust or moisture invasion will be experienced due to the extremely small spacing between the opposed key contacts. It follows that the key contacts will be inadvertently engaged. To preclude these difficulties, the keyboard unit is of the sealed type. As suggested in FIG. 19(A), the flexible film 5 is folded about the region 56 and the peripheral portions thereof are bonded together through the use of an adhesive 59 except the folded region 56. In this case, the adhesive 59 has only to be applied to three peripheral edge portions, thereby facilitating the bonding procedure in case of the sealed type key board unit.

Since the two opposed major regions of the flexible film 5 are spaced a small distance, the distance between the key contacts 51, 52 will vary due to expansion or condensation of air within the sealed spacing to adversely influence upon the switching functions. In other words, it is needed to permit air to escape from the sealed keyboard unit when the key actuators are manually operated. Consequently, air escape apertures should be formed.

Nevertheless, in the case that the air escape apertures are formed in this manner, air within the sealed spacing is discharged via the escape apertures due to sudden variations in pressure when the key actuators are depressed, whereas outside air can not be introduced promptly via the air escape apertures when the key actuators are released. In other words, although the key switch can be quickly closed upon depression of the key actuators, it cannot be opened immediately after the key actuators are free from depression.

Figures 20A, 20B:
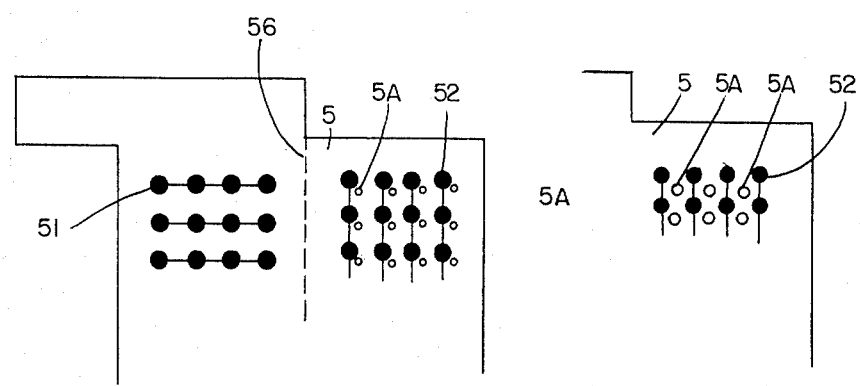

Some ways to solve these problems are shown in FIG. 20. In FIG. 20(A), the air escape apertures 5A are formed adjacent the key contact region 52 which is positioned above the other contact region 51 under the folded state of the flexible film 5. In the example shown in FIG. 20(B) the air escape apertures 5A are formed intermediate the adjacent key contacts 52.

Figure 20C:
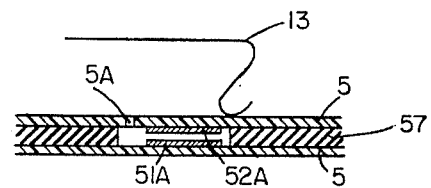

FIG. 20(C) is a cross sectional view of another example of the sealed key switch assembly wherein the air escape aperture 5A is formed adjacent the key contact 52A of the upper region of the folded flexible film 5. The other key contact 51A is positioned below the lower region of the flexible film 5 with intervention of the spacer 57. The leaf spring 13 is positioned above the flexible film 5.

With such an arrangement, when the key actuator is depressed, the leaf spring 13 forces the upper portion of the flexible film 5 in the downward direction and at this time air is escaped from the many apertures 5A and, subsequent to this, air is introduced promptly via the many apertures 5A after the release of the depression of the key actuators. Quick switching functions are attainable. Dust invasion will be avoided because of the extremely small apertures.

Figure 21A:
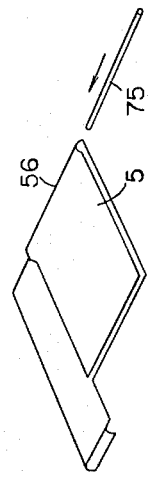
FIGS. 21(A) and 21(B) are explanatory diagrams of the folded printed circuit flexible film employed with the present invention.

FIG. 21(A) illustrates an insulator rod 57 positioned about the folding region 56 of the flexible film 5, which is available in case of the sealed type keyboard unit, thereby preventing breaking of the leaf conductors about the folding region 56. By intervention of the insulator rod 75, the folding region 56 of the flexible film 5 is gently curved along the insulator rod 75.

Figure 21B:
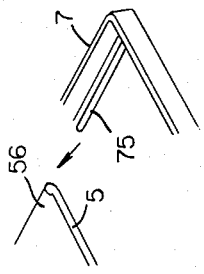

FIG. 21(B) illustrates a modification of FIG. 21(A) wherein the insulator rod 75 is formed integrally on the lower casing 7 to thereby omit the necessity for the insulator rod 75. Needless to say, the insulator rod 75 may be useful with the folded flexible film 5 shown in FIG. 13.

[ POWER BATTERY]

As clear from FIG. 3, one or more power batteries 4 are secured within a compartment 4A at the side of the key actuator unit 1, the compartment 4A being defined by the liquid crystal cell 21 and the integral key actuator unit 1. The illustrative example comprises a serially connected pair of batteries 41, guide plates 42, 43 holding the batteries and leaf springs 36, 37.

The leaf springs 36, 37 are made of electrically conductive, elastic material and, as obvious from FIG. 11, are secured on the extension 24 of the liquid crystal cell 21 for the purposes of establishing electrical connections between the batteries 41 and the data processor MOS/LSI chip 31. Each of the respective leaf spring members 36, 37 are provided at one end thereof with "U" shaped holding regions 36A, 37A and at the other end with contact regions 36B, 37B to the batteries 41. The leaf spring members 36, 37 are secured side-by-side to meet at right angles to the direction of the extension 24 of the liquid crystal cell 21. Under these circumstances the holding regions 36A, 37A are secured under pressure on the extension 24, while the contact regions 36B, 37B are oriented toward the batteries 41.

Terminal regions 33, 39 are provided on the extension 24 of the glass sheet 22 where the holding regions 36A, 37 are secured, the terminal regions 33, 39 being electrically connected to the LSI chip 31. Accordingly, electrical connections to the LSI chip 31 are accomplished concurrently with installation of the leaf spring members 36, 37 onto the extension 24.

Referring to FIG. 3, the first guide plate 42 is shown as having groove regions 42A, 42B where the contact regions 36B, 37B of the leaf spring members 36, 37 are received. The guide member 42 is secured on the lower casing 7 in such a way as to connect the contact regions 36B, 37B received within the groove regions 42A, 42B to the electrode terminals of the batteries 41.

The second guide plate 43 which holds the other ends of the batteries 41, is secured on the lower cabinet 7 to confront against the first guide plate 42. This plate 43 includes a contact region 43A, a groove region 43B receiving the contact region 43A and a cutout region 43C corresponding to the other battery 41.

The contact region 43B is made of a spirally-shaped wire of electrically conducting and elastic nature, the spiral portion thereof being received within the groove 43B and held in electrical engagement with the electrode terminal of the one battery 41.

The contact region 43B serves also as a major component of a power switch. The end of the spirally-shaped portion extends to a position corresponding to the cutout region 43C. That extension 43A' is normally positioned out the cutout region 43C. The extension 43A' is a movable contact region that will be connected directly to the electrode terminal of the other battery 41 through the cutout region 43C in response to depression or movement toward the battery 41.

A sliding knob 44 which operates the movable contact region 43A', is slidably secured out the guide plate 42. When the sliding knob 44 is shifted in the direction shown by the arrow A, the movable contact region 43A' will be forced toward the battery 41 to render the power switch ON. If the sliding knob 44 is shifted back, the depression of the movable contact region 43A' will be released. This results in that the contact region 43A' is separated from the electrode terminal of the battery 41 due to its elastic nature, to thereby render the power switch OFF. The contact region 43A' may be formed of leaf spring materials instead of the used wire material.

Since the power supply 4 is secured through utilization of the compartment 4A, these constitutional components can be closely deposited to thereby attain compactness and small size of the power supply unit 4. In addition, because the leaf spring contacts 36, 37 are secured directly on the extension 24 of the liquid crystal cell 21 for the purposes of providing connections between the batteries 41 and the LSI chip 31, connection path lengths can be remarkably reduced to minimize voltage drop on the leaf connectors therebetween. The possibility of incomplete contact will be minimized due to the thus reduced points of connection. Since the connections between the batteries 41 and the LSI chip 31 also are provided on the extension 24 of the liquid crystal cell, all the connections inclusive that with the remaining components can be focused on the extension 24. This affords many of merits to the fabrication of calculators. Because the contact region 43A' secured on the guide plate 43 serves also as the power switch, the number of necessary components is reduced with accompanying simplification in the power supply assemblying procedure.

Figure 22A:
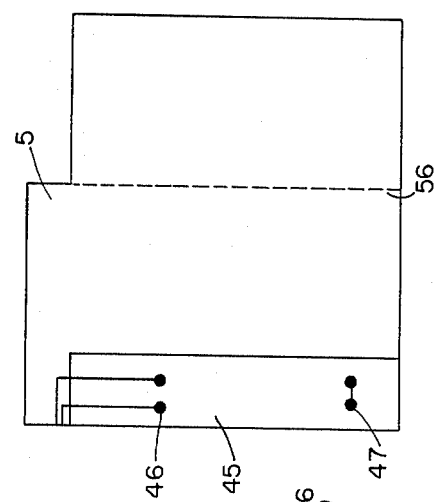
FIGS. 22(A) and 22(B) are explanatory diagrams of modification in the power supply unit employed with the present invention.

FIG. 22 shows modification in the battery power supply 4. In FIG. 22(A), a region 45 holding the batteries 41 is integrally united with the flexible film 5 and connection contact regions 46, 47 with the batteries 41 are formed concurrently with the formation of the leaf conductors on the flexible film 5.

Figure 22B:
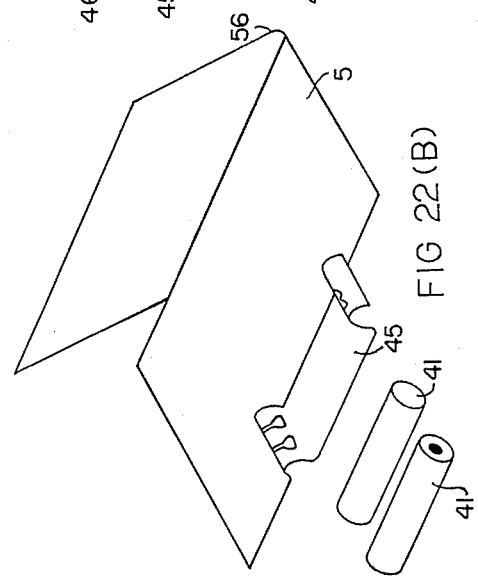

As viewed from FIG. 22(B), both end portions of the holding region 45 are curved in such a way that the contact regions 46, 47 confront the electrode terminals of the batteries 41 respectively, that curved regions being maintained with the aid of a support member (not shown) formed in the lower casing 7. The batteries 41 are housed within the holding region 45. In this case, the battery holding region 45 can be formed concurrently with the fabrication of the flexible film 5, to thereby minimize the necessary number of parts and attain reduction in manufacture cost.

Although there has been described above specific arrangements of the electronic liquid crystal display calculators in accordance with the invention for the purpose of illustrating the manner in which the invention may be used to advantage, it will be appreciated that the invention is not limited thereto. Accordingly, any modifications, variations or equivalent arrangements which may occur to those skilled in the art should be considered to be within the scope of the invention.

What is claimed is:
1. An electronic calculator comprising:
  keyboard means having a plurality of integral key actuators for introducing data into said calculator on which computations are to be preformed;
  a data processor unit implemented with an LSI semiconductor chip for performing computation functions on the data introduced by said keyboard means;
  a multi-digit liquid crystal display means for displaying data introduced by said keyboard means and results of the computation functions performed by said data processor unit, said liquid crystal display means having a portion with electrical terminals thereon which extends from one end of said display means and supports said LSI semiconductor chip thereon;
  a printed circuit flexible film having electrical leaf conductors formed thereon in a predetermined pattern, said electrical leaf conductors having portions which define electrical key contacts for cooperation with said key actuators and terminals for interconnection with said terminals of said liquid crystal display; and
  means for holding said electrical key contacts of said printed circuit flexible film in juxtaposition to said respective key actuators and said terminals of said film into contact with said terminals of said liquid crystal display.

2. An electronic calculator of claim 1, wherein said liquid crystal display comprises a pair of glass sheets and a layer of liquid crystal composition sandwiched between said glass sheets, one of said glass sheets having a longitudinal extension beyond one end of the other glass sheet, said extension comprising the electrical terminal portion of said liquid crystal display means.

3. An electronic calculator as set forth in claim 2 wherein one or more batteries are provided within a cavity defined by the extension of the glass sheet of said multi-digit liquid crystal display and the integral key actuators of said keyboard.

4. An electronic calculator as set forth in claim 3 wherein electrical connection between said batteries and said printed circuit flexible film are provided on said extension of the glass sheet.

5. An electronic calculator as set forth in claim 4 wherein the connection means between said batteries and said printed circuit flexible film comprise a leaf spring secured directly on said extension of the glass sheet to contact the batteries.

6. An electronic calculator as set forth in claim 2 wherein said data processor LSI chip is mounted on said extension of the glass sheet.

7. An electronic calculator as set forth in claim 6 wherein the LSI chip is photobonded to said longitudinal extension of said glass sheet.

8. An electronic calculator as set forth in claim 1 wherein said keyboard is of the sealed type where the key contact carrying printed circuit flexible film is folded and attached together at the periphery by means of adhesive.

9. An electronic calculator of claim 1, wherein said key contacts of said flexible film are formed in spaced pairs disposed in opposed relationship, whereby the actuation of a corresponding key actuator causes engagement between the opposed contacts of the respective pairs.

10. An electronic calculator of claim 9, wherein said printed circuit flexible film is folded at an intermediate portion to provide two opposed substantially planar surfaces and said spaced pairs of key contacts are formed on said opposed surfaces.

11. The electronic calculator of claim 10, wherein there is further provided a spacer member between the opposed surfaces of said flexible film, said spacer member having apertures therethrough in the regions of said key contact pairs.

12. An electronic calculator as set forth in claim 10 wherein an insulator rod is secured about the folding region of said printed circuit flexible film.

13. An electronic calculator comprising:
  a keyswitch unit for introducing data into said calculator;

a liquid crystal display unit including a liquid crystal material disposed between a pair of glass sheets for displaying said data and calculation results;

said keyswitch unit and said liquid crystal display unit being disposed in overlaying registry with a printed circuit flexible film;

one of said glass sheets of said liquid crystal display having a longitudinal extension from one end thereof beyond the opposed surface of the other glass sheet;

said printed circuit flexible film having a like extension in registry with the longitudinal extension of said one glass sheet;

an LSI semiconductor data processor chip disposed on said longitudinal extension in electrical communication with said keyswitch unit and said liquid crystal display unit;

battery means disposed in a cavity defined by one edge of said keyswitch unit and the respective extended portions of said liquid crystal display and said flexible film; and terminal means on the respective extended portions of sad display unit and flexible film for providing electrical interconnections between said keyswitch unit, said display unit, and said LSI data processor chip.

14. An electronic calculator as set forth in claim 13 wherein said liquid crystal display is a field effect mode liquid crystal cell with a pair of polarizing filters spaced at a short distance from said cell on opposite sides thereof.

15. An electronic calculator as set forth in claim 14 wherein one of the polarizing filters is secured on a housing for said calculator.

16. An electronic calculator as set forth in claim 14 wherein the spacing between the polarizing filters and the liquid crystal cell is selected longer than the wavelength of light.

17. An electronic calculator comprising:
keyboard means having a plurality of integral key actuators for introducing data into said calculator on which computations are to be performed;

a data processor unit implemented with an LSI semiconductor chip for performing computation functions on the data introduced by said keyboard means;

a multi-digit liquid crystal display means for displaying data introduced by said keyboard means and results of the computation functions performed by said data processor unit, said liquid crystal display means having a portion with electrical terminals thereon which extends from one end of said display means;

a printed circuit flexible film having electrical leaf conductors formed thereon in a predetermined pattern, said electrical leaf conductors having portions which define electrical key contacts for cooperation with said key actuators and terminals for interconnection with said terminals of said liquid crystal display, said key contacts being formed on said printed circuit flexible film by a layer of aluminum with a carbon coating, said layer of aluminum being deposited over the entire area of said flexible film and said carbon coating being selectively deposited on said layer of aluminum in the areas of said key contacts by an etching process; and means for holding said electrical key contacts of said printed circuit flexible film in juxtaposition to said respective key actuators and said terminals of said film into contact with said terminals of said liquid crystal display.

18. An electronic calculator comprising:
keyboard means having a plurality of integral key actuators for introducing data into said calculator on which computations are to be performed;

a data processor unit implemented with an LSI semiconductor chip for performing computation functions on the data introduced by said keyboard means;

a multi-digit liquid crystal display means for displaying data introduced by said keyboard means and results of the computation functions performed by said data processor unit, said liquid crystal display means having a portion with electrical terminals thereon which extends from one end of said display means;

a printed circuit flexible film having electrical leaf conductors formed thereon in a predetermined pattern, said electrical leaf conductors having portions which define electrical key contacts for cooperation with said key actuators and terminals for interconnection with said terminals of said liquid crystal display, said printed circuit flexible film being folded to form two opposed layers which are sealed together at the periphery of said opposed layers, said flexible film further including air escape holes therein to permit the escape of air from between said two opposed layers; and means for holding said electrical key contacts of said printed circuit flexible film in juxtaposition to said respective key actuators and said terminals of said film into contact with said terminals of said liquid crystal display.

19. An electronic calculator comprising:
keyboard means having a plurality of integral key actuators for introducing data into said calculator on which computations are to be performed;

a data processor unit implemented with an LSI semiconductor chip for performing computation functions on the data introduced by said keyboard means;

a multi-digit liquid crystal display means for displaying data introduced by said keyboard means and results of the computation functions performed by said data processor unit, said liquid crystal display means having a portion with electrical terminals thereon which extends from one end of said display means;

a printed circuit flexible film having electrical leaf conductors formed thereon in a predetermined pattern, said electrical leaf conductors having portions which define electrical key contacts for cooperation with said key actuators and terminals for interconnection with said terminals of said liquid crystal display; and means for holding said electrical key contacts of said printed circuit flexible film in juxtaposition to said respective key actuators and said terminals of said film into contact with said terminals of said liquid crystal display, said means for holding including separable cabinets at least one of which has a member extending therefrom for forcing said flexible film toward said longitudinal extension of said glass sheet to compress said terminals of said flexible film against said liquid crystal display terminals.

20. An electronic calculator as set forth in claim 19 wherein said member extending from at least one of said separable cabinets has an elastic member mounted thereon.

21. An electronic calculator comprising:
  keyboard means having a plurality of integral key actuators for introducing data into said calculator on which computations are to be performed;
  a data processor unit implemented with an LSI semiconductor chip for performing computation functions on the data introduced by said keyboard means;
  a multi-digit liquid crystal display means for displaying data introduced by said keyboard means and results of the computation functions performed by said data processor unit, said liquid crystal display means having a portion with electrical terminals thereon which extends from one end of said display means;
  a printed circuit flexible film having two substantially orthogonal leg portions and electrical leaf conductors formed thereon in a predetermined pattern, said electrical leaf conductors having portions which define electrical key contacts for cooperation with said key actuators on one of said leg portions and terminals for interconnection with said terminals of said liquid crystal display on the other of said leg portions, said key contacts being formed on two juxtaposed sections on a common surface of said flexible film separated by a portion of said film about which said two sections are folded to bring the respective key contacts on the respective juxtaposed sections into opposed alignment, a plurality of electrical lead wires extending from the contacts of said respective sections to said portions of said leaf conductors which define terminals for interconnection with said terminals of said liquid crystal display; and
  means for holding said electrical key contacts of said printed circuit flexible film in juxtaposition to said respective key actuators and said terminals of said film into contact with said terminals of said liquid crystal display.

22. An electronic calculator as set forth in claim 21 wherein said other of said orthogonal leg portions is in registry with said extended portion of said display means.

* * * * *